No. 701,899. Patented June 10, 1902.
J. E. LARSON.
COMBINED CORN HARVESTER, HUSKER, AND LOADER.
(Application filed Mar. 6, 1902.)
(No Model.) 6 Sheets—Sheet 1.

Witnesses
Inventor
Joseph E. Larson
By H. B. Willson & Co.
Attorneys

No. 701,899. Patented June 10, 1902.
J. E. LARSON.
COMBINED CORN HARVESTER, HUSKER, AND LOADER.
(Application filed Mar. 6, 1902.)

(No Model.) 6 Sheets—Sheet 4.

Witnesses

Inventor
Joseph E. Larson,
By
Attorneys

THE NORRIS PETERS CO., PHOTO-LITHO., WASHINGTON, D. C.

No. 701,899. Patented June 10, 1902.
J. E. LARSON.
COMBINED CORN HARVESTER, HUSKER, AND LOADER.
(Application filed Mar. 6, 1902.)
(No Model.) 6 Sheets—Sheet 5.
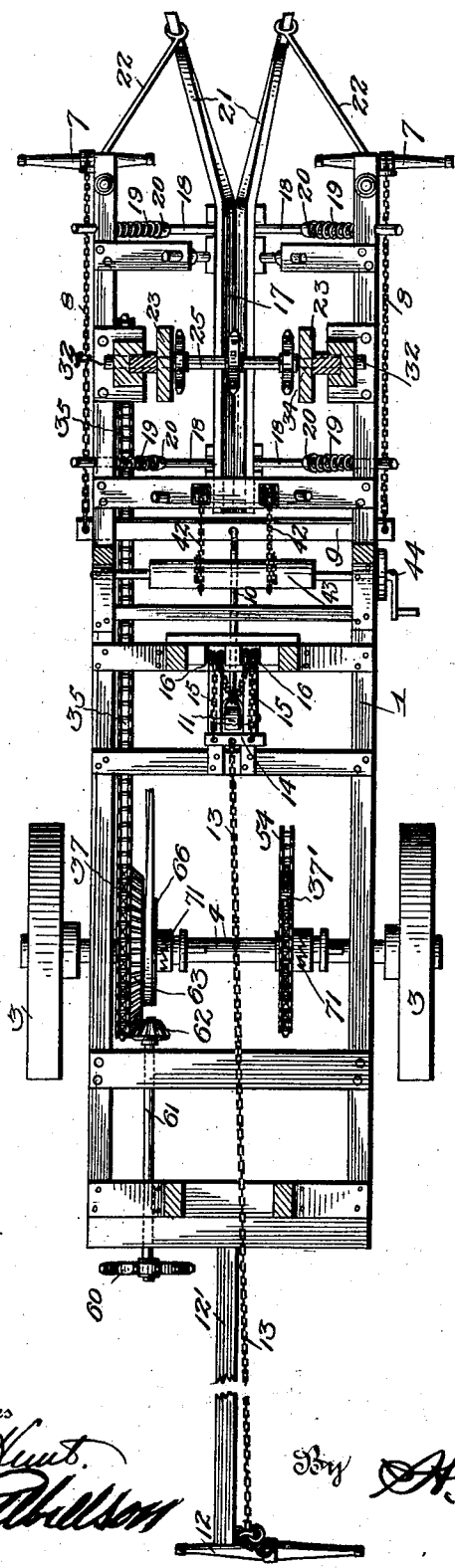

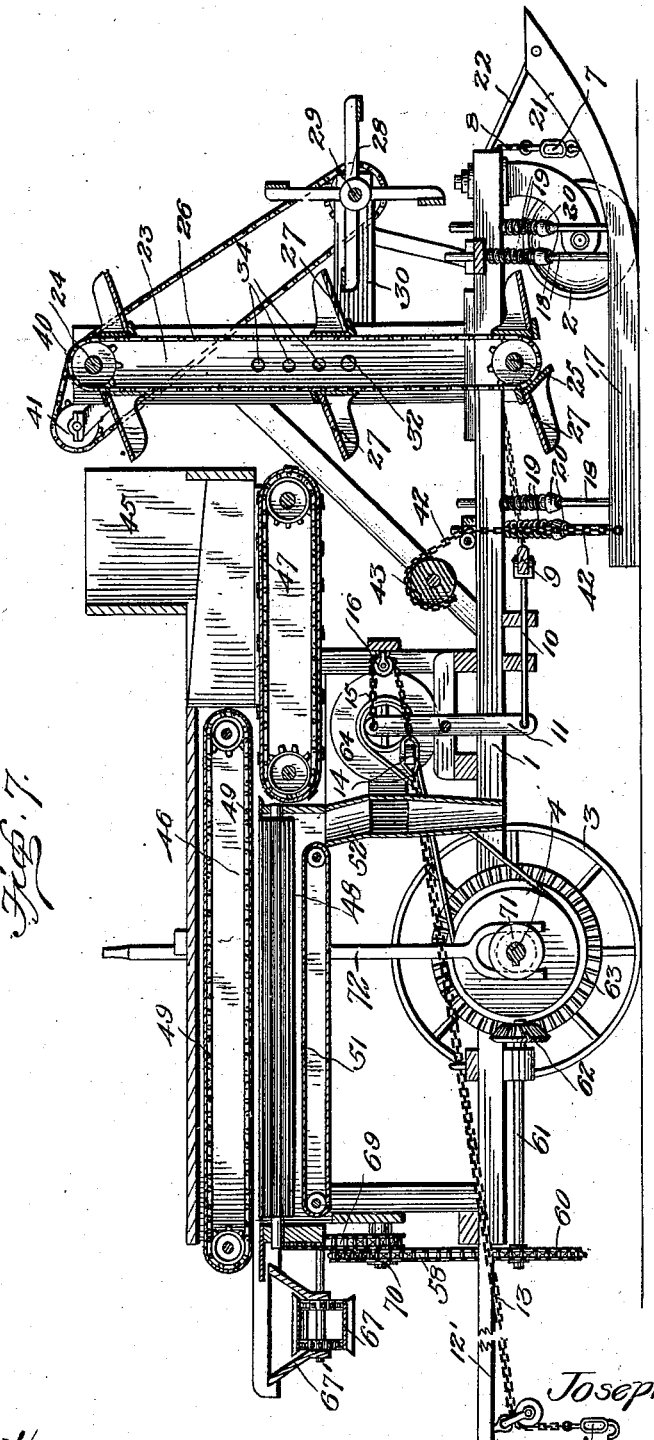

UNITED STATES PATENT OFFICE.

JOSEPH E. LARSON, OF SILVERCREEK, NEBRASKA.

COMBINED CORN HARVESTER, HUSKER, AND LOADER.

SPECIFICATION forming part of Letters Patent No. 701,899, dated June 10, 1902.

Application filed March 6, 1902. Serial No. 96,982. (No model.)

*To all whom it may concern:*

Be it known that I, JOSEPH E. LARSON, a citizen of the United States, residing at Silvercreek, in the county of Merrick and State of Nebraska, have invented certain new and useful Improvements in a Combined Corn Harvester, Husker, and Loader; and I do declare the following to be a full, clear, and exact description of the invention, such as will enable others skilled in the art to which it appertains to make and use the same.

This invention relates to a combined corn harvester, husker, and loader.

The object of the invention is to provide an apparatus which is designed to be driven through a field of standing corn and which will operate to remove the ears from the stalks along each row, to detach the husks from the ears, and to deliver the husked ears to a wagon or suitable receptacle, the prime object being to provide a light, durable, and comparatively inexpensive machine which will perform this work in an efficient manner.

With this and other objects in view, which will readily appear as the nature of the invention is better understood, said invention consists in certain novel features of construction and combination and arrangement of parts, which will be hereinafter fully described, defined in the appended claims, and illustrated in the accompanying drawings, in which—

Figure 1:
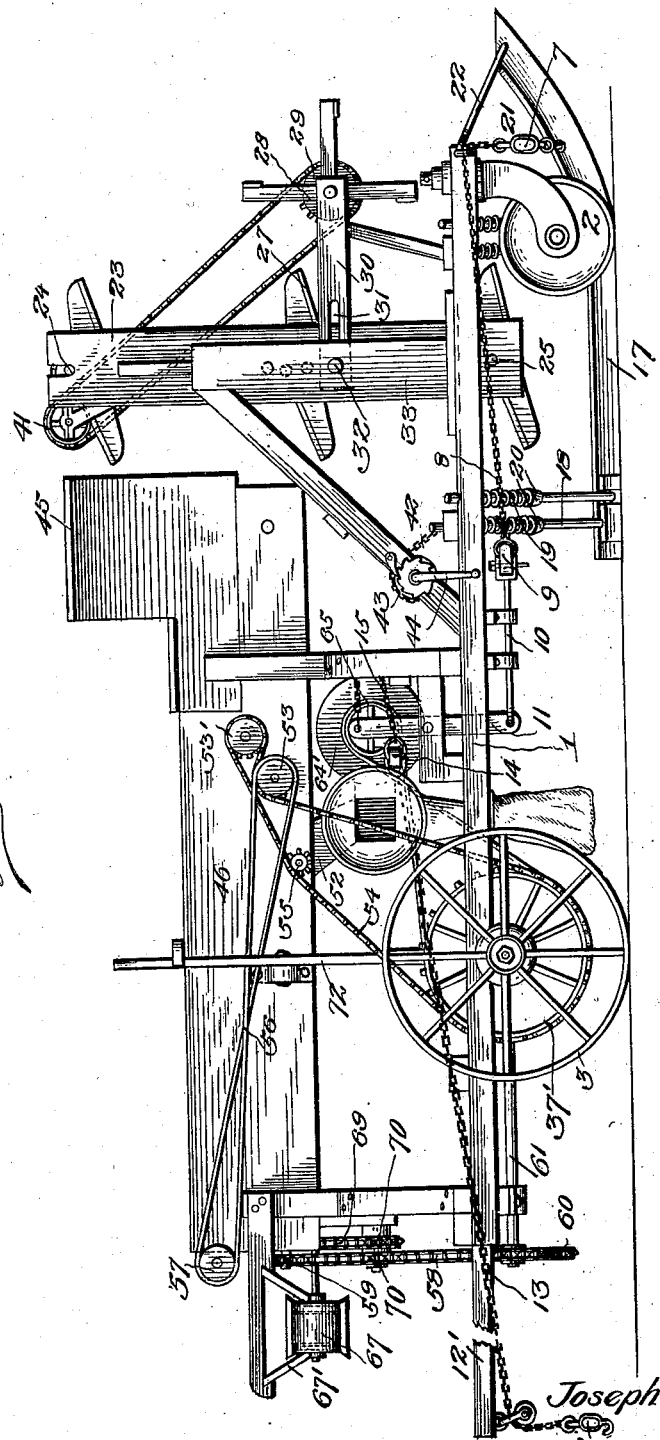
Figure 2:
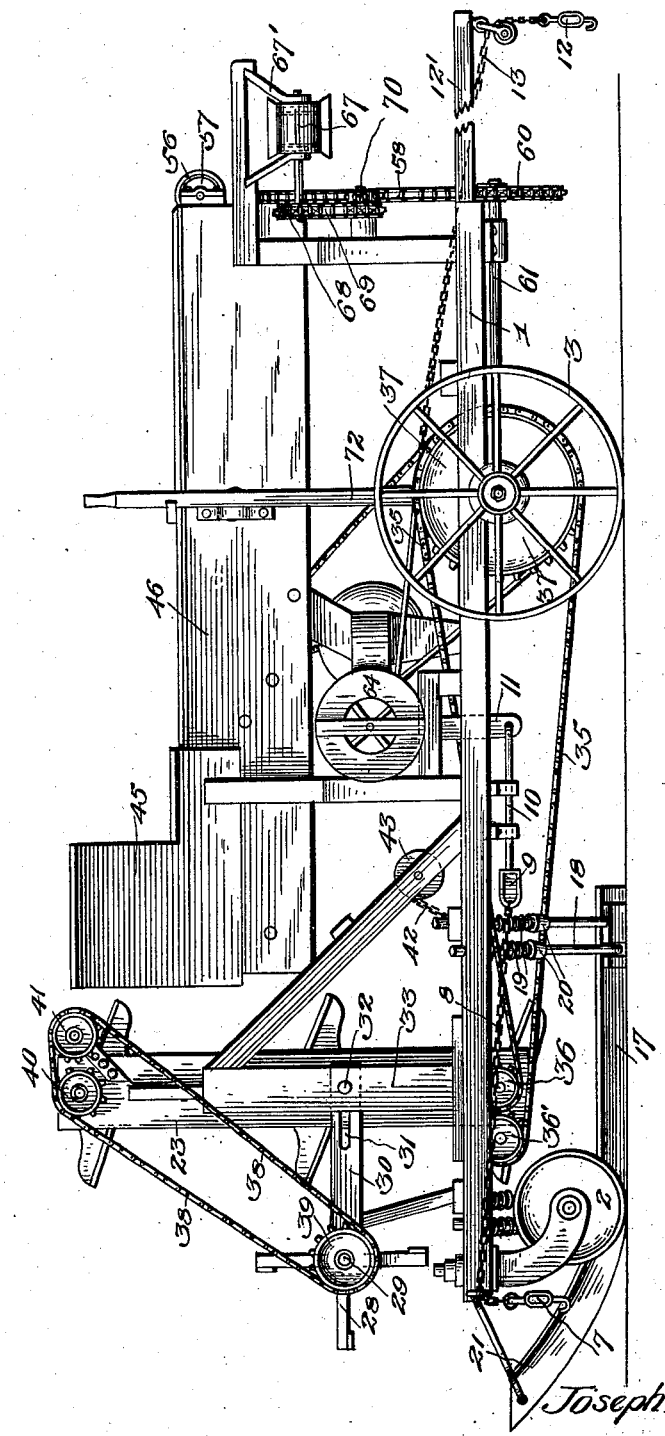
Figure 3:
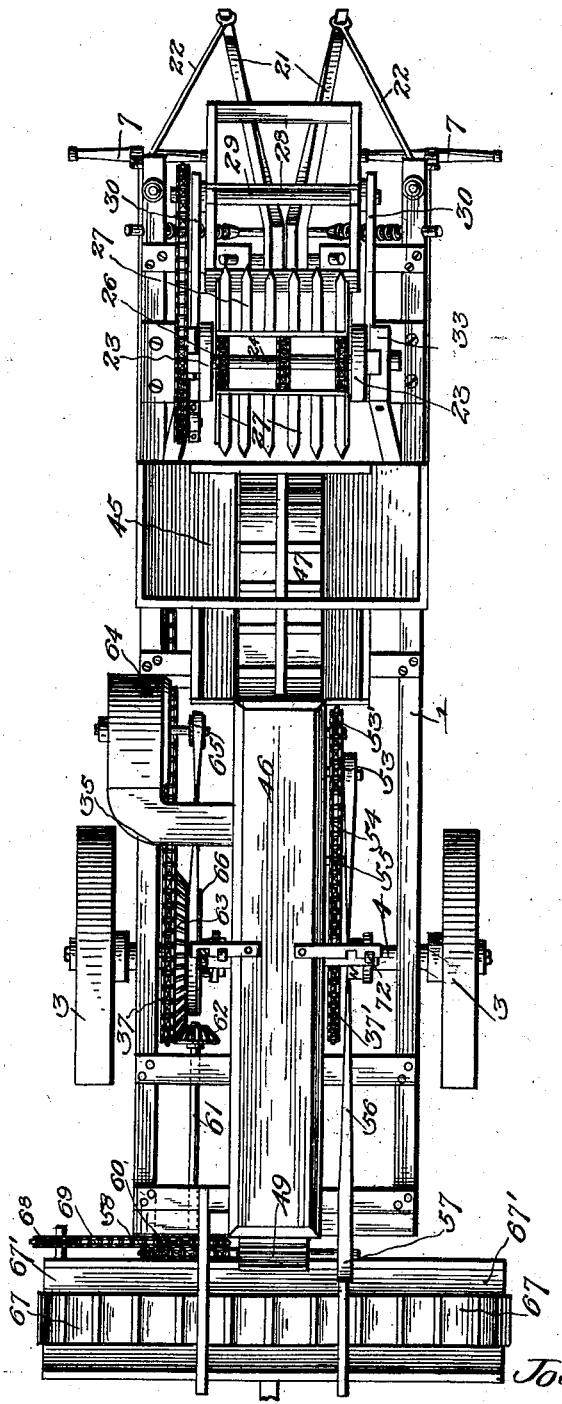
Figure 4:
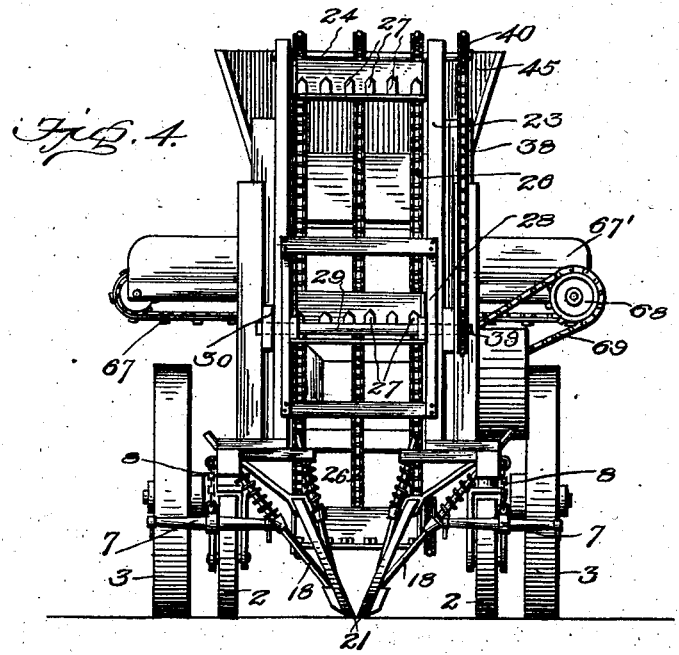
Figure 5:
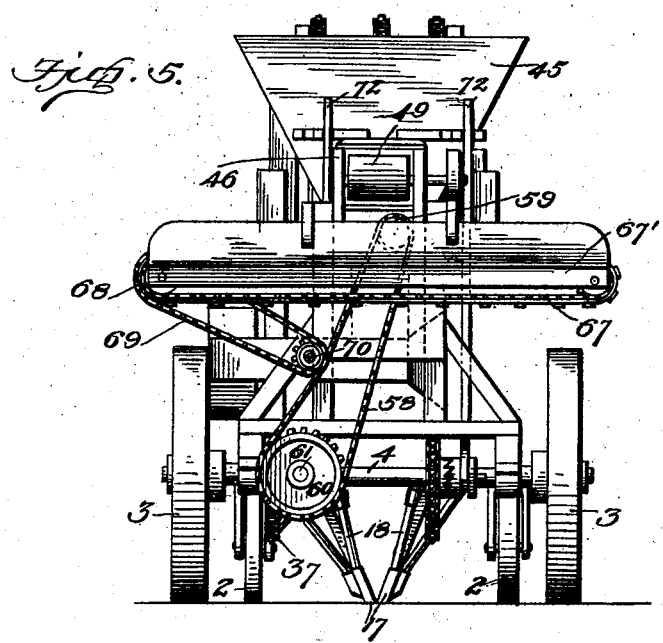

Figures 1 and 2 are opposite side elevations of the apparatus. Fig. 3 is a top plan view thereof. Figs. 4 and 5 are front and rear elevations. Fig. 6 is a horizontal section on line 6 6 of Fig. 1. Fig. 7 is a longitudinal section through the husking-chamber; and Fig. 8 is a detail section through the rear axle, illustrating the pawl-and-ratchet connection of the rear wheels to said axle.

Referring now more particularly to the drawings, the numeral 1 designates the supporting-frame for the apparatus, the same being mounted at the front upon the caster-wheels 2, which adapt the apparatus to be freely turned, and at the rear end upon traction-wheels 3, carried by the drive-shaft or axle 4. The drive-shaft is provided at each end with a pivoted pawl 5 to engage ratchet-teeth 6 on the wheels to permit each of the wheels when serving as a pivot-wheel to turn backwardly while the other is turned forwardly to prevent strain or twisting of the drive-shaft when the apparatus is being turned.

The apparatus is designed to be drawn by four horses, two being arranged at the front and two at the rear. The front horses or draft-animals are connected to the singletrees 7, which are secured to the forward ends of the draft-chains 8, which are in turn connected at their rear ends to a doubletree 9, hung upon a draft-rod 10, slidably mounted upon the frame. This draft-rod is connected at its rear end to the lower end of a vertically-arranged pivoted equalizing-bar 11. The two rear draft-animals are attached to a doubletree 12, which is attached to the rear end of a draft chain or cable 13, running over a pulley attached to the outer end of a rear draft-pole 12' and connected at its forward end to a head or cross-bar 14, from which extends short chains or cables 15, which pass around pulleys 16 on the front portion of the frame in advance of the equalizing-bar 11 and then extend rearwardly and are connected to the upper end of said bar. By this construction it will be seen that the equalizing-bar is so connected to the front and rear draft-cables as to equalize the pulling strain on the two teams of draft-animals.

Located beneath the forward end of the frame is a pair of parallel longitudinally-extending runners 17, which are suspended from the frame by hanger-bars 18, said hanger-bars being pivotally connected to the runners and slidably mounted in the frame, so as to be movable with the runners as the latter are forced apart by the stalks or are pressed inward by the action of the tension-springs 19. These tension-springs 19, one of which is provided upon each bar, surround the hanger-bars, between heads 20 thereon and the frame, and serve to force the runners toward each other, thus adapting them to exert a gripping action on the stalks to prevent the stalks from being pulled up by the gatherer in the action of the latter in detaching the ears from the stalks.

To the forward ends of the runners are pivoted outwardly inclined or flaring guides 21, which guide or conduct the stalks thereto as the machine moves forward along the row, so that the stalks will be brought between the forward ends of the runners at a point suitable for the gatherer to act upon the ears. These runners are reinforced and braced by the braces 22, connecting the same with the frame.

The gatherer comprises in its construction a suitable frame 23, carrying at its ends transverse shafts 24 and 25 and arranged vertically at the front of the frame immediately in rear of the front end of the runners 17. An endless conveyer 26 passes around the shafts 24 and 25 and is provided with gathering devices 27 in the form of spaced teeth or tines, between which as the machine moves along the ears of corn enter, and as the endless conveyer travels these teeth or tines exert a pulling action on the ears and strip them from the stalks. At this time the stalks are held firmly and prevented from being uprooted under the pull of the gathering devices upon the ears by the runners 17, which grip them immediately above the surface of the ground. The tops of the stalks carrying the ears are forced against the gathering devices by a rotating wheel 28, mounted upon a shaft 29, journaled in arms 30, provided at their rear ends with slots 31, in which fit pins or bolts 32, carried by standards 33, rising from the frame, which pins are also adapted to enter sockets 34 in the gatherer-frame 23 to support the latter at any desired elevation to permit of the adjustment of said frame vertically according to the height of the ridges in the plowed field. By means of the slots 31 and pins 32 the arms 30 may also be adjusted in a direction longitudinally of the frame to bring the frame in proper position relatively to the gathering device 27.

The endless conveyer 26 is driven by a sprocket-chain 35, running over a sprocket-pinion 36 on the transverse shaft 25 and an idler 36' on the conveyer-frame and connecting the same with a master sprocket-wheel 37 on the main drive-shaft or axle 4.

The reel 28 receives motion through the medium of a sprocket-chain 38, passing around a sprocket-wheel 39 on the shaft 29 and over a sprocket-wheel 40 on the conveyer-shaft and an idler 41, adjustably mounted on the conveyer-frame, said idler being adjustable to compensate for the raising and lowering of the conveyer-frame and to maintain the chain 38 at the desired tension.

The runners 17 are vertically adjustable by means of chains 42, passing over suitable pulleys on the frame and connected to the roller-shaft 43, which shaft is provided at one end with a crank-handle 44 for taking up or letting out the chain to properly adjust said runners.

Arranged in rear of the gatherer so as to receive the ears from the gathering devices at the top of the return stretch of the conveyer 26 is a hopper 45, which is in communication with the forward end of a husking-chamber 46, suitably mounted upon the frame 1. Moving in this hopper is a belt 47, which conveys the ears to the husking-rolls 48. These rolls extend longitudinally in the chamber 46, and the ears are conveyed thereto from the belt 47 by a belt 49, which also acts to force the ears down upon said rolls, so that the latter will readily grip and tear off the husks, which discharge, together with the grains of corn, onto a belt 51, by which they are conveyed to a discharge-spout 52. The belt 47 has connected to one of its shafts a combined gear-wheel and pulley 53, which receives motion from a master gear-wheel 37' on the drive-shaft 4 through the medium of a sprocket-chain 54, which engages the sprocket-toothed portion of said wheel 53. The chain 54 also engages and drives a sprocket-pinion 55 on one of the shafts of the belt 51, whereby said belt is driven and passes around an idler 53', whereby the two stretches of the chain are maintained in proper engagement with the gear 53 and pinion 55. A crossed belt 56 communicates motion from the pulley portion of the wheel 53 to a pulley-wheel 57 on one of the shafts of the belt 49, thus driving said belt in the proper direction to feed the ears to the husking-rolls.

The husking-rolls are driven by a sprocket-chain 58, connecting a pinion 59 on one of said rolls with a sprocket-wheel 60, carried by a short shaft 61, which has a beveled gear 62 meshing with beveled gear-teeth 63 on the master drive-wheel 37.

As stated, the detached grain-kernels and husks are carried by the belt 51 to a discharge-spout 52, and in communication with this spout is a blower 64, which delivers a blast of air to force dirt, husks, dust, and finer particles of foreign matter from the kernels, so that the latter may be delivered clean to a bag or other suitable receptacle. The shaft of the fan carries a pulley 65, which is driven by a belt from a master-pulley 66, carried by the master gear-wheel 37.

The husked ears of corn are delivered by the action of the belt 49 to an endless conveyer 67, mounted upon a trough or frame 67' at the rear end of the frame, this conveyer 67 being connected up, so as to be driven in either direction to either side of the frame. To this end one of the shafts of the conveyer 67 is provided with a sprocket-wheel 68, which is driven by a chain 69 from a double sprocket-wheel 70. This sprocket-wheel 70 receives motion from the sprocket-chain 58, one of the stretches of which engages one of the sprocket-tooth portions of said wheel. By arranging this engaging stretch of the chain 58 above or below the sprocket-wheel 70 the direction of rotation of said sprocket-wheel may be varied to adapt the conveyer to run in either direction as desired.

The master gear-wheels 37 37' are thrown into and out of engagement with the driving-shaft 4 by means of clutches 71, which are operated by the shifting bars or levers 72. By employing these levers the gearing at either side of the machine or at both sides may be thrown into and out of operation at will.

The conveyer 66 is adapted to deliver the husked ears of corn into a wagon driven alongside the machine.

From the foregoing description, taken in connection with the accompanying drawings, the construction, mode of operation, and advantages of my improved corn harvester, husker, and loader will be readily apparent without requiring an extended explanation.

Various changes in the form, proportion, and the minor details of construction may be resorted to without departing from the principle or sacrificing any of the advantages of this invention.

Having thus described the invention, what I claim, and desire to secure by Letters Patent, is—

1. In an apparatus of the character described, the combination with a reel; of a gatherer comprising an endless conveyer provided with teeth or tines to engage and remove the ears from the stalks held by the reel, means for vertically adjusting the gatherer and horizontally adjusting the reel, and gearing for driving the gatherer and reel.

2. In a machine of the character described, the combination with a gatherer for detaching the ears from the stalks; of runners for engaging the stalks to prevent the uprooting of said stalks when the gatherer is detaching the ears, and springs yieldingly supporting said runners and normally pressing the same toward each other.

3. In a machine of the character described, the combination with a gatherer; of runners adapted to engage the stalks to prevent uprooting of said stalks while the gatherer is detaching the ears, springs acting on the runners to normally force them toward each other, and means for vertically adjusting said runners.

4. In a machine of the character described, the combination with a gatherer; of runners for engaging the stalks to prevent the uprooting thereof when the gatherer is detaching the ears, hangers pivoted to the runners and movably connected with the frame of the machine, springs acting on said hangers for normally pressing the runners toward each other, and means for vertically adjusting the runners, substantially as specified.

5. In a machine of the character described, the combination with a gatherer; of spring-actuated runners for engaging the stalks to hold the same fast while the gatherer is detaching the ears, and guides connected to said runners for guiding the stalks to the gatherer.

In testimony whereof I have hereunto set my hand in presence of two subscribing witnesses.

JOSEPH E. LARSON.

Witnesses:
M. L. ROSSITER,
J. P. LARSON.